June 5, 1928.
C. J. YOUNG
1,672,672
PHOTO ELECTRIC PHOTOMETER
Filed Jan. 20, 1927
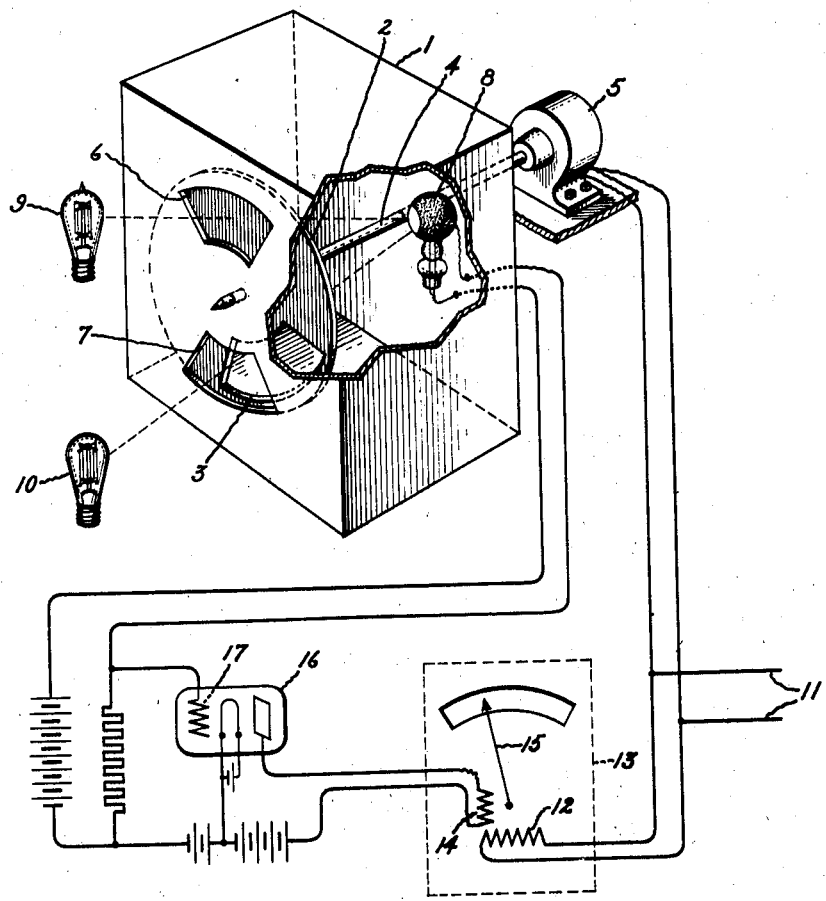
Inventor:
Charles J. Young,
by *[signature]*
His Attorney.

Patented June 5, 1928.

1,672,672

UNITED STATES PATENT OFFICE.

CHARLES J. YOUNG, OF SCHENECTADY, NEW YORK, ASSIGNOR TO GENERAL ELECTRIC COMPANY, A CORPORATION OF NEW YORK.

PHOTO-ELECTRIC PHOTOMETER.

Application filed January 20, 1927. Serial No. 162,406.

My present invention relates to an arrangement employing a photo-electric cell for comparing the intensity of illuminating power of two beams of light.

While it is frequently desirable, in measuring illumination, or light density of a substance, to obtain measurements which are accurate to within 1 per cent, this is often quite impossible owing to difficulties in maintaining the calibration of circuits employing light sensitive cells. Heretofore, in the use of photo-electric photometers employing a single light sensitive cell and two sources of light cooperating with the cell, it has been customary to interrupt light directed on to the cell from the two sources by means of a rotating sectioned mirror and to thus produce currents proportional to the illuminating power of the light sources. These currents are supplied to a circuit containing a commutator driven by a motor operating in synchronism with the rotating mirror and the commutated currents are supplied to a galvanometer which deflects in one direction or the other according as one or the other light is the stronger. The commutator, when employed as indicated, has been found to be a source of trouble and it is one of the objects of the present invention to provide a photometric arrangement which avoids the use of rotating commutators, and at the same time provides an accurate measure of the difference in illuminating power of two beams of light.

According to the present invention a meter comprising a stationary and movable coil is employed as the indicating unit. The stationary coil is energized from an alternating current source and the movable coil is energized with direct current during both portions of the alternating wave, the current supplied to the movable coil during the positive portion of the alternating wave being proportional to the illuminating power of one beam of light and that supplied to it during the negative portion of the wave being proportional to the illuminating power of the other beam. As thus arranged movement of the coil will give an indication of the relative illuminating power of the two beams of light.

The novel features which I believe to be characteristic of my invention are set forth with particularity in the appended claims. My invention itself, however, will best be understood from reference to the following specification when considered in connection with the accompanying drawing in which the single figure shows diagrammatically an arrangement and circuit organization whereby my invention may be carried into effect.

Referring to the drawing, I have indicated at 1 a box or receptacle provided with a rotating disk 2 adjacent one side thereof. Disk 2 has a segmental slot 3 cut therein and is mounted on a shaft 4 driven by a synchronous motor 5. A pair of similar and equally diametrically opposite segmental slots 6 and 7 each of which is similar and substantially equal in area to the slot 3 is provided in the side of box 1 adjacent the disk 2. A photo-electric cell 8 is mounted on the inside of box 1 while a standard source of light 9 and variable source of light 10 are mounted on the outside of the box and adjacent slots 6 and 7 respectively. The light sources 9 and 10 alternately direct light on to cell 8 as the disk 2 revolves and brings the slot 3 opposite slots 6 and 7.

A source of alternating current is connected through mains 11 to a synchronous motor 5 and to the stationary coil 12 of an indicating device 13. Indicator 13 is provided with a movable coil 14 which cooperates with coil 12 and carries a pointer 15 which may be weighted if desired to prevent flickering. Energization of coil 14 is controlled by the light sensitive cell 8 through an electron discharge device 16 which is provided with the usual anode, cathode and grid or control element 17. Coil 14 is connected in the output circuit of the discharge device 16 while the light sensitive cell is connected to the grid or control element 17.

If no light falls on the sensitive cell a negative potential is supplied to the control element of the discharge device 16 and no current flows in the output circuit. As the slot in disk 2 comes opposite either slot 6 or 7 light is directed on to the cell 8 and current flows through the cell reducing the negative potential of control element 17 and permitting current to flow through coil 14. Light source 9 directs light on to cell 8 during approximately one half period of the alternating current wave, as for example, the positive period, while source 10 directs light on to the cell during the negative period of the wave.

Whenever light is directed on to cell 8 current flows in coil 14 and always in the same direction. Since coil 14 is energized twice during each cycle of the alternating current in mains 11 and both times in the same direction while coil 12 is energized in opposite directions during each cycle, it will be seen that coil 14 will tend to move in one direction during one half of the alternating wave and in the opposite direction during the succeeding half cycle. The net result will be that the pointer 15 mounted on coil 14 will remain stationary if coil 14 is energized equally during both halves of the alternating current wave. If, however, the light beam from source 10 has greater illuminating power than that from source 9 the current through cell 8 will be greater when the light from source 10 is directed on to cell 8 than when light is directed onto the cell from source 9. As a result the grid or control element 17 will be less negative during one half of the alternating current wave than during the other half of the wave and the pointer 15 will move to one side of the vertical position and give an indication of the relative intensity of the two light sources.

When the light densities of two samples of material are to be compared the light sources 9 and 10 are replaced by these samples and the samples are illuminated from another and preferably a single source of illumination. The operation of the remainder of the equipment is the same as described above.

Further, it is obvious that the ability of two samples to reflect light can be compared in an analogous way and with no alteration in the principle employed.

What I claim as new and desire to secure by Letters Patent of the United States, is:

1. In combination, an indicating unit comprising relatively movable coils, means whereby an alternating current may be supplied to one of the coils, a light sensitive cell, a source of light cooperating with the cell, a rotary disk interposed between said source of light and said cell, said disk having a segmental slot therein through which light may be directed from said source on to the light sensitive cell, and means for rotating said disk in synchronism with the alternating current wave whereby the light sensitive cell may be energized in synchronism with the energization of said one coil and a connection between the light sensitive cell and the other coil of the indicating unit.

2. In combination, an indicating unit comprising a stationary coil and a movable coil, means for supplying an alternating current to the stationary coil, an electric discharge device having input and output circuits, said output circuit including said movable coil, a light sensitive cell connected in said input circuit, means producing two beams of light, and means for directing one of said beams on to said cell during the positive half of the alternating wave and the other beam during the negative half of said wave.

3. Means for comparing two light beams, said means comprising an indicating unit having a pair of relatively movable coils, means whereby an alternating current may be supplied to one of the coils, a light sensitive cell, a rotary disk, means for rotating said disk in synchronism with the alternating current wave, said disk having two slots therein through which said light beams may be directed onto said light cell, said slots being so disposed on the disk that one light beam is directed onto the light cell during one-half cycle of the alternating current wave and the other light beam during the other half of the alternating current wave, and a connection from said light cell to the other coil of the indicating unit.

In witness whereof, I have hereunto set my hand this 18th day of January, 1927.

CHARLES J. YOUNG.